United States Patent [19]

Jeon

[11] Patent Number: 5,755,957

[45] Date of Patent: May 26, 1998

[54] WATER SUPPLY SHUT-OFF DEVICE FOR WATER PURIFIER

[75] Inventor: Je-Dal Jeon, Suwon, Rep. of Korea

[73] Assignee: Samsung Electronics Co., Ltd., Suwon, Rep. of Korea

[21] Appl. No.: 558,532

[22] Filed: Nov. 16, 1995

[30] Foreign Application Priority Data

Nov. 14, 1994 [KR] Rep. of Korea ............... 94-30249

[51] Int. Cl.$^6$ ................................... B01D 35/00
[52] U.S. Cl. ................. 210/86; 210/85; 210/91; 210/137; 210/136; 210/134; 210/92; 210/257.2
[58] Field of Search .................. 210/257.2, 85, 210/91, 210, 137, 136, 134, 92, 86

[56] References Cited

U.S. PATENT DOCUMENTS

| 4,626,346 | 12/1986 | Hall | 210/137 |
| 4,683,054 | 7/1987 | Turnbull | 210/91 |
| 5,082,557 | 1/1992 | Grayson et al. | 210/257.2 |
| 5,454,944 | 10/1995 | Clack | 210/257.2 |
| 5,587,089 | 12/1996 | Vogel et al. | 210/91 |

*Primary Examiner*—Ana Fortuna
*Attorney, Agent, or Firm*—Burns, Doane, Swecker & Mathis, L.L.P.

[57] ABSTRACT

A water supply shut-off device for a water purifier including a purifier body, a pre-processing filter, a membrane filter, a post-processing filter, a pressure pump, a water tank seated on the purifier body and adapted to store water purified while passing through the pre-processing filter, the membrane filter and the post-processing filter, in this order, by a pumping operation of the pressure pump, and a water supply valve adapted to control the supply of the purified water to the water tank. The water supply shut-off device includes a tank separation sensing unit for sensing a separation of the water tank from the purifier body, a control unit for controlling the overall purifying operation of the water purifier on the basis of the sensing result of the tank separation sensing unit, a pump driving unit for controlling the pressure pump under a control of the control unit to shut off the supply of the purified water to the water tank when the water tank is sensed as being separated from the purifier body, and a valve driving unit for controlling the water supply valve under a control of the control unit to shut off the supply of the purified water to the water tank when the water tank is sensed as being separated from the purifier body.

6 Claims, 5 Drawing Sheets

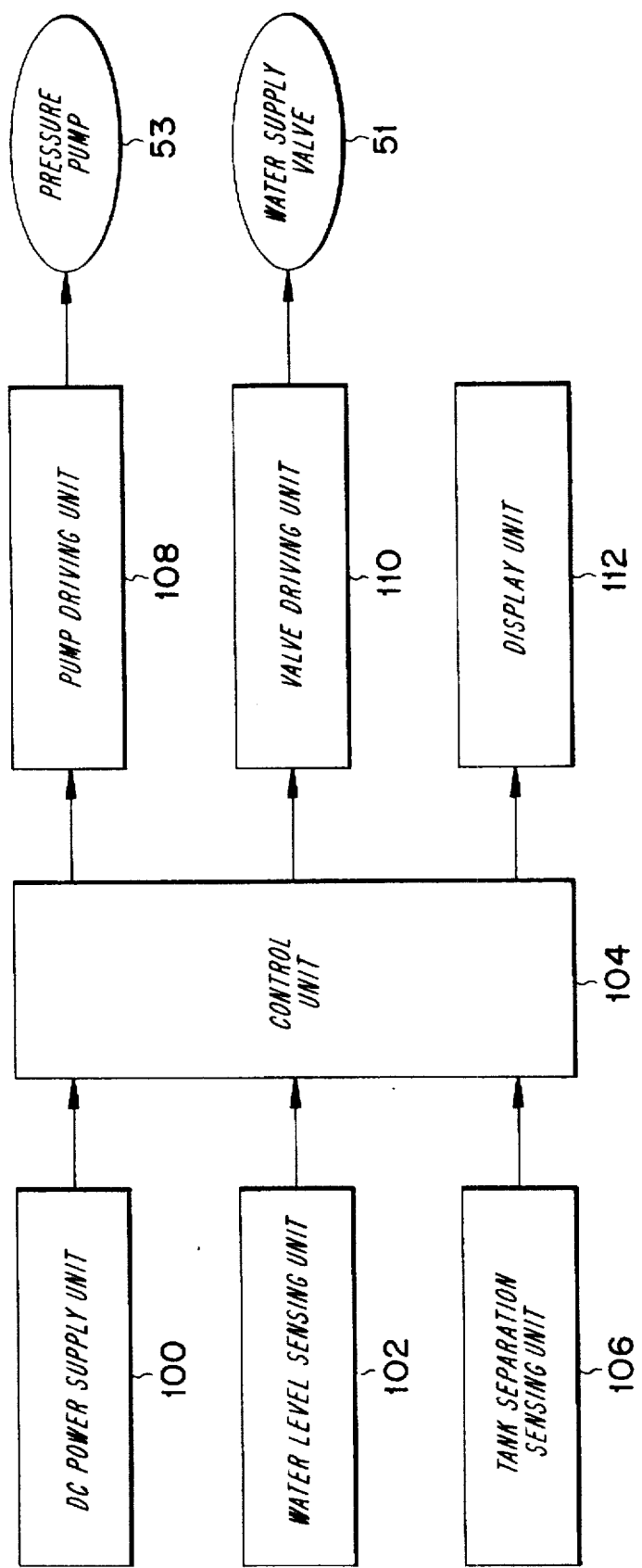

WATER SUPPLY SHUT-OFF DEVICE FOR WATER PURIFIER

BACKGROUND OF THE INVENTION

1. Field of the Invention

The present invention relates to a water purifier for removing noxious pollutant substances contained in fresh water such as tap water to purify the water, and including a removable water tank for storing purified water.

2. Description of the Prior Art

Typically, water purifiers are used to remove noxious pollutant substances contained in fresh water such as tap water, in order to supply purified water. They are classified into a natural filtering type, a forced filtering type, an ion exchanging resin type and a reverse osmotic type in accordance with the methods for purifying water.

Water purifiers of the reverse osmotic type, which force fresh water to pass through an artificial osmotic membrane (reverse osmotic filter) while applying pressure to the fresh water, can remove heavy metals, bacteria, cancer-causing materials and the like contained in the water, thereby purifying the water. Since the reverse osmotic water purifiers can supply pure water containing only dissolved oxygen, they have been used in fields such as super-pioneering scientific industry, medical science or cleaning for super-precise electronic elements. Recently, such reverse osmotic water purifiers have widely been used as domestic water purifiers for supplying drinkable water.

FIG. 1 illustrates a conventional reverse osmotic water purifier having the above-mentioned function. As shown in FIG. 1, the water purifier includes a purifier body 4 which is connected to a faucet 1 via a water supply pipe 3. This water supply pipe 3 is coupled to the faucet 1 by means of an adapter 2. The purifier body 4 is supplied with fresh water, such as tap water, from the faucet 1 through the water supply pipe 3. The fresh water introduced in the purifier body 4 passes through a pre-processing filter 5 disposed at the rear portion of the purifier body 4. The pre-processing filter 5 removes various harmful organic chemical materials such as chlorine components and the like from the water passing therethrough. The water emerging from the pre-processing filter 5 then passes through a water supply valve which controls the amount of the water supply. The water from the water supply valve is then introduced in a pressure pump so that it can be pressurized to a certain pressure level. The pressurized water is fed to a membrane filer 6 including a plurality of membranes (not shown). While passing through the membranes, the water becomes free of heavy metals, bacteria, cancer-causing materials and the like contained therein. The water emerging from the membrane filter 6 then passes through a post-processing filter 7 by which odorous substances such as noxious gas are removed from the water.

The water, which has a pleasant taste as it becomes free of odorous substances such as noxious gas while passing through the post-processing filter 7, is then fed to a water tank 9 through a water supply port 8.

When the purified water is supplied in the water tank 9, it is determined whether the amount of water contained in the water tank 9 corresponds to a full water level (namely, the maximum water amount requiring to shut off the supply of purified water to the water tank) or an empty water level (namely, a minimum water amount requiring to supply purified water to the water tank).

Where the amount of water contained in the water tank 9 corresponds to the full water level, the supply of purified water to the water tank 9 is shut off. On the other hand, where the amount of water in the water tank 9 corresponds to the empty water level, the water tank 9 is supplied with purified water. In such a manner, the water tank 9 is always stored with a constant amount of purified water.

The purified water stored in the water tank 9 can be discharged through a discharge port 11 by manipulating a water discharge lever 10 so that it will be drinkable.

The water tank is often separated from the purifier body for cleaning its interior to remove foreign matter therefrom or for using a large amount of purified water at once. In this case, however, it is inconvenient to do so because the supply of purified water through the water supply port is not shut off unless the main power is cut off. When the water tank is separated from the purifier body without cutting off the main power, purified water is leaked out of the water purifier. As a result, there is a degradation in cleanliness.

Furthermore, the water that leaks out of the water tank may cause a malfunction of the water purifier. There is also a danger such as leakage of electricity.

SUMMARY OF THE INVENTION

Therefore, an object of the invention is to solve the above-mentioned problems and to provide a water supply shut-off device for a water purifier, capable of automatically cutting off electric power, upon a water tank separating from the water purifier, to stop the water purifying operation, thereby providing convenience upon using the water purifier and improving the sanitariness and reliance of the water purifier.

In accordance with the present invention, this object is accomplished by providing in a water purifier including a purifier body, a pre-processing filter, a membrane filter, a post-processing filter, a pressure pump, a water tank seated on the purifier body and adapted to store water purified while passing through the pre-processing filter, the membrane filter and the post-processing filter, in this order, by a pumping operation of the pressure pump, and a water supply valve adapted to control the supply of the purified water to the water tank, a water supply shut-off device comprising: tank separation sensing means for sensing whether or not the water tank has been separated from the purifier body and generating a sensing signal indicative of the sensing result; control means for determining whether or not the water tank has been separated from the purifier body on the basis of the sensing signal from the tank separation sensing means and controlling the overall purifying operation of the water purifier on the basis of the determined result; pump driving means for controlling the pressure pump under a control of the control means to shut off the supply of the purified water to the water tank when the control means determines the water tank as being separated from the purifier body; and valve driving means for controlling the water supply valve under a control of the control means to shut off the supply of the purified water to the water tank when the control means determines the water tank as being separated from the purifier body.

BRIEF DESCRIPTION OF THE DRAWINGS

Other objects and aspects of the invention will become apparent from the following description of embodiments with reference to the accompanying drawings in which:

FIG. 5 is a block diagram illustrating the water supply shut-off device according to the present invention.

DETAILED DESCRIPTION OF THE PREFERRED EMBODIMENTS

Figure 1:
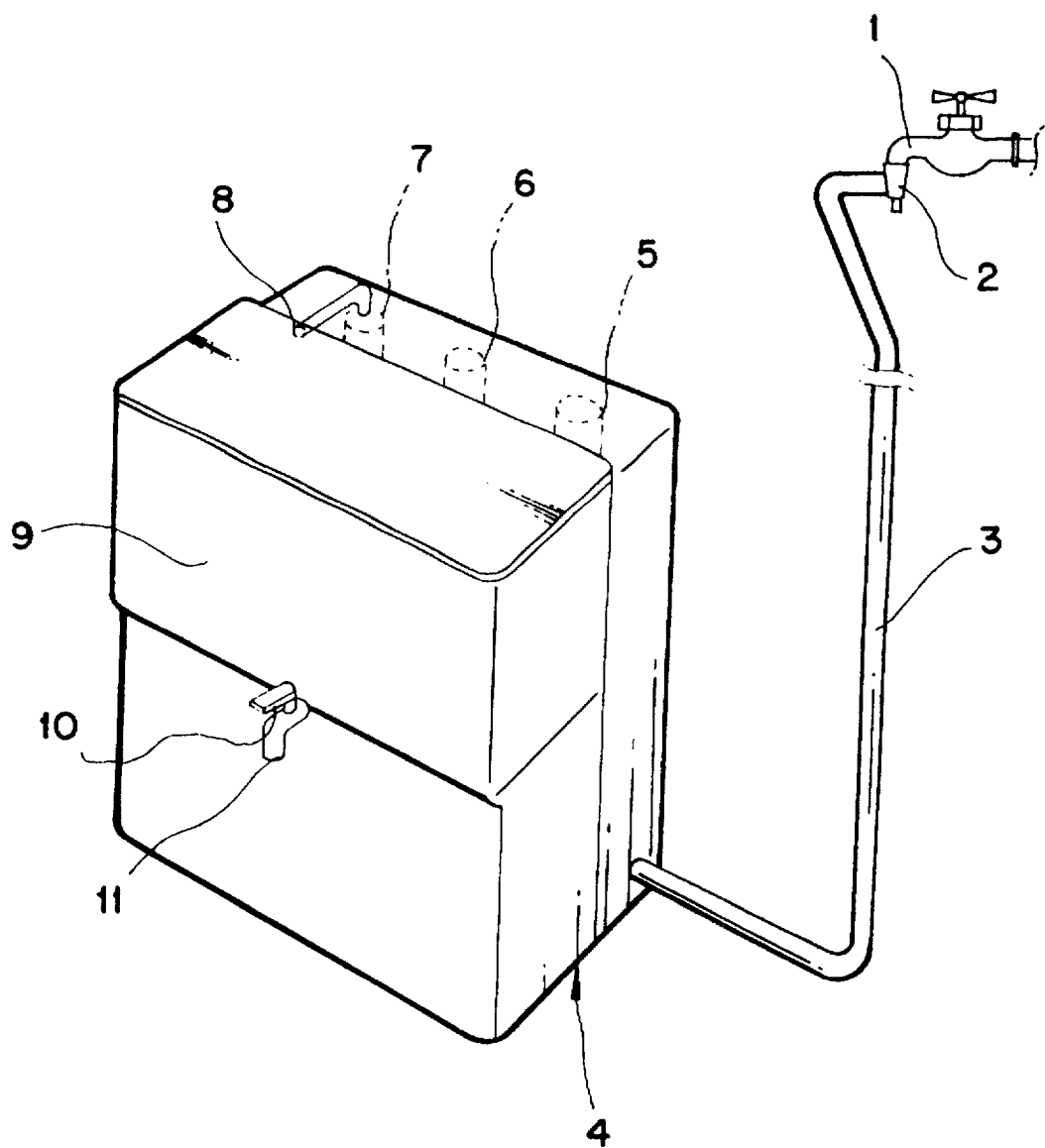
FIG. 1 is a perspective view illustrating the overall construction of a conventional water purifier.
Figure 2:
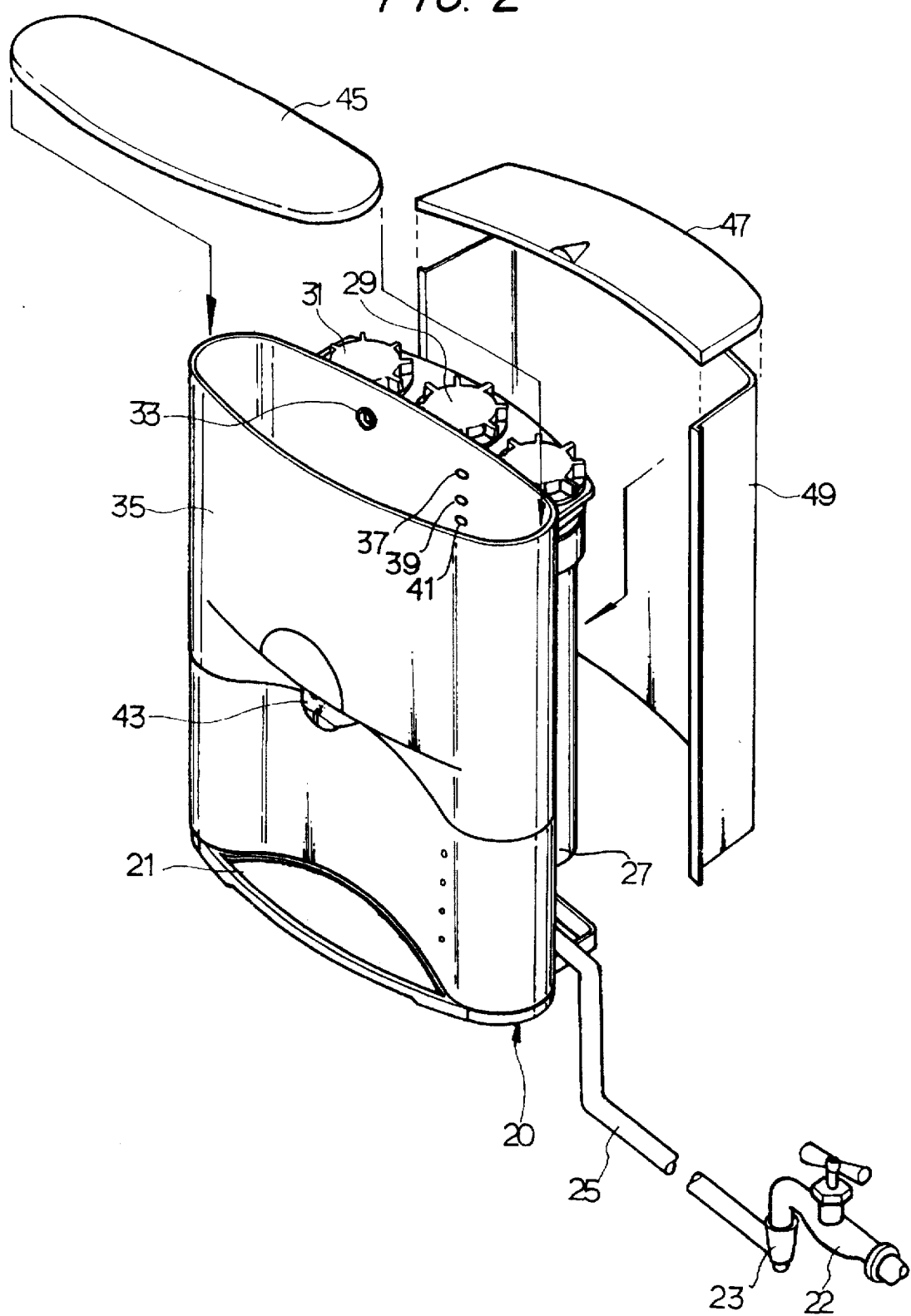
FIG. 2 is an exploded perspective view illustrating a water purifier to which a water supply shut-off device according to an embodiment of the present invention is applied.

FIG. 2 illustrates a water purifier to which a water supply shut-off device according to an embodiment of the present invention is applied.

In FIG. 2, the reference numeral 20 denotes a body of the water purifier. The purifier body 20 is provided at its front portion with a cup receiving portion 21 for receiving a water receptacle such as cup.

At the rear side of the purifier body 20, a water supply pipe 25 is connected at one end to the purifier body 20. The other end of the water supply pipe 25 is connected to a faucet 22 by means of a connecting member 23. In the purifier body 20, a pre-processing filter 27 is disposed. The preprocessing filter 27 is connected to the water supply pipe 25 and adapted to remove various harmful organic chemical substances such as chlorine components and the like from fresh water supplied from the faucet 22.

At one side of the pre-processing filter 27, a membrane filter 29 is disposed which includes a plurality of membranes (not shown) serving to remove heavy metals, bacteria, cancer-causing materials and the like contained in the water emerging from the pre-processing filter 27. A post-processing filter 31 is connected to the membrane filter 29 to remove odorous substances, such as noxious gas, contained in the water emerging from the membrane filter 29.

A water tank 35 is separably seated on the purifier body 20. The water tank 35 has a water inlet port 33 to receive and store the water purified by the post-processing filter 31. The water tank 35 is also provided at its inner rear surface with a pair of water level sensors 37 and 39 respectively adapted to sense different amounts of purified water stored in the water tank 35 corresponding to the full and empty water levels.

A water discharge lever 43 is coupled to the front surface of the water tank 35 to discharge the purified water stored in the water tank 35 through a water discharge port (not shown). The water tank 35 is covered at its top portion with an upper cover 45. At the rear side of the upper cover 45, another upper cover 47 is separably coupled to the top portion of the purifier body 20. At the rear side of the purifier body 20, a rear cover 49 is also coupled to the purifier body 20.

In FIG. 2, the reference numeral 41 denotes a ground terminal.

Figure 3:
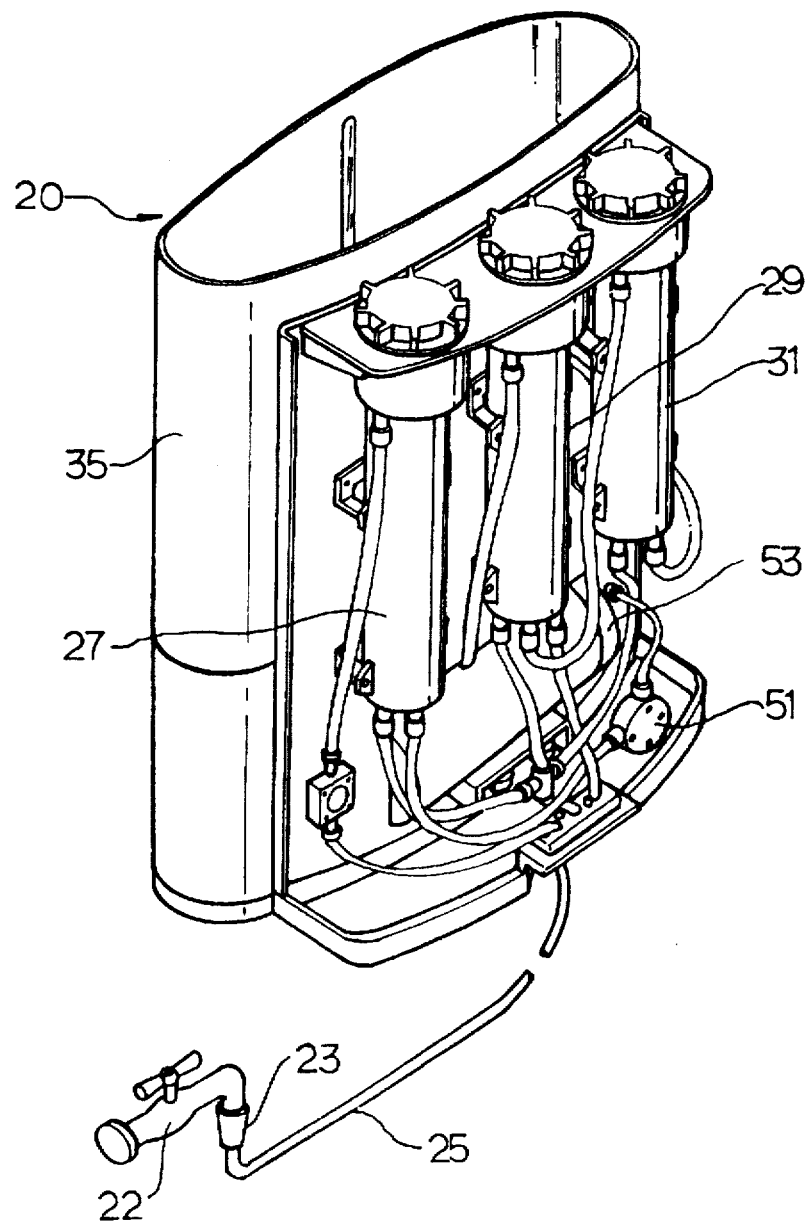
FIG. 3 is a rear perspective view of the water purifier shown in FIG. 2.

Beneath the post-processing filter 31, a water supply valve 51 is disposed, which is connected between the post-processing filter 31 and the water tank 35, as shown in FIG. 3. The water supply valve 51 is opened and closed in accordance with the amount of purified water contained in the water tank 35, namely, the water level of the water tank 35. A pressure pump 53 is connected between the pre-processing filter 27 and the membrane filer 29 to apply pressure to the water emerging from the pre-processing filter 27, thereby feeding the water to the membrane filter 29 at a certain pressure. Since water under pressure is fed to the membrane filter 29 by the pressure pump 53, it can be purified by the membrane filter 29 in a reverse osmotic manner.

Figure 4:
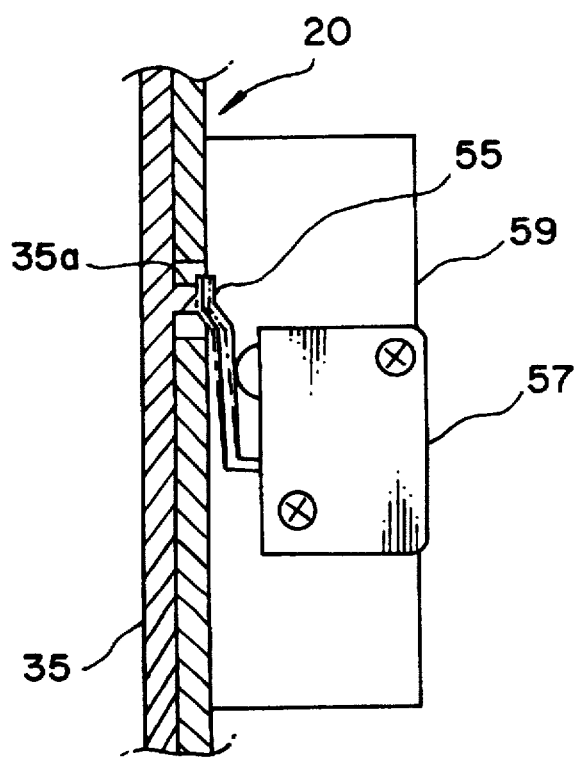
FIG. 4 is an enlarged sectional view illustrating a microswitch included in the water supply shut-off device according to the present invention.

At the rear side of the water tank 35, a microswitch 57 is mounted to the purifier body 20 by means of a bracket 59 fixed to the inner surface of the purifier body 20, as shown in FIG. 4. The microswitch 57 serves to sense whether or not the water tank 35 has been separated from the purifier body 20. The microswitch 57 has a contact lever 55 which is in elastic contact with a protrusion 35a provided at the outer surface of the water tank 35.

FIG. 5 is a block diagram illustrating the water supply shut-off device according to the present invention.

As shown in FIG. 5, the water supply shut-off device includes a DC power supply unit 100 for converting a source voltage from a commercial AC power source, input at an AC power input stage (not shown), into a DC voltage with a voltage level required to drive the water purifier. The water supply shut-off device also includes a water level sensing unit 102 for sensing the amount of water stored in the water tank 35, namely, the water level of the water tank 35. The water level sensing unit 102 comprises the water level sensors 37 and 39 which sense the full and empty water levels of the water tank 35, respectively.

Both the DC power supply unit 100 and water level sensing unit 102 are coupled to a control unit 104. This control unit 104 serves to receive the DC voltage from the DC power supply unit 100 and to initialize the water purifier in response to the DC voltage. The control unit also receives a water level sensing signal from the water level sensing unit 102 and controls the overall water purifying operation of the water purifier on the basis of the received water level sensing signal. The control unit 104 is a microcomputer. A tank separation sensing unit 106 is also provided to sense whether or not the water tank 35 has been separated from the purifier body 20 and to send the resultant sensing signal to the control unit 104. This tank separation sensing unit 106 comprises the microswitch 57.

To the control unit 104, a pump driving unit 108 is coupled which controls the pressure pump 53 under a control of the control unit 104. The pump driving unit 108 receives a control signal which is generated from the control unit 104 in accordance with sensing signals from the water level sensing unit 102 and tank separation sensing unit 106. In accordance with the control signal, the pump driving unit 108 controls the pressure pump 53, which increases the pressure of water to a certain level, to control the supply of water from the faucet 22 via the water supply pipe 25.

A valve driving unit 110 is also coupled to the control unit 104 to control the water supply valve 51. The valve driving unit 110 receives a control signal which is generated from the control unit 104 in accordance with sensing signals from the water level sensing unit 102 and tank separation sensing unit 106. In accordance with the control signal, the valve driving unit 110 controls the water supply valve 51 to control the supply of water from the faucet 22 via the water supply pipe 25.

The water supply shut-off device further includes a display unit 112 which receives various control signals generated from the control unit 104 and displays the operation conditions respectively corresponding to the received control signals so that the user can easily check the operation of the water purifier and proper times for respective replacements of the pre-processing filter 27, membrane filter 29 and post-processing filter 31.

The operation of the water supply shut-off device having the above-mentioned construction will now be described.

Once the water purifier is powered activated, the DC power supply unit 100 converts a source voltage received from a commercial AC power source at its AC power input stage (not shown) into a DC voltage with a voltage level required to drive the water purifier. The DC voltage from the DC power supply unit 100 is then applied to the control unit 104 as well as various driving circuits.

Upon receiving the DC voltage from the DC power supply unit 100, the control unit 104 initializes operation of the water purifier.

At this time, the amount of water stored in the water tank 35, namely the water level of the water tank 35 is sensed by the water level sensing unit 102, namely, the water level sensors 37 and 39 which serve to sense the full and empty water levels, respectively. Water level data from the water level sensing unit 102 is sent to the control unit 104.

When the water level of the water tank 35 sensed by the water level sensing unit 102 through the water level sensors 37 and 39 is not lower than a middle water level, the control unit 104 controls the water purifier to standby for its water purifying operation until the water level of the water tank 35 is lower than the middle water level because the water tank 35 is not required to be supplied with purified water.

When the water level of the water tank 35 is lowered below the empty water level by the lapse of time, it is sensed by the empty water level sensor 39 which, in turn, sends data indicative of the sensed water level to the control unit 104.

Upon receiving the data from the water level sensing unit 102, the control unit 104 applies a control signal to both the pump driving unit 108 and valve driving unit 110 to carry out a water purifying operation for supplying purified water to the water tank 35.

In accordance with the control signal from the control unit 104, the pump driving unit 108 supplies the source voltage to the pressure pump 53, thereby causing the pressure pump 53 to be driven. Similarly, the valve driving unit 104 supplies the source voltage to the water supply valve 51 under a control of the control unit 104, thereby opening the water supply valve 51.

When the water supply valve 51 is opened, it allows water from the faucet 22 to be fed to the water supply pipe 25 via the connecting member 23. The water introduced in the water supply pipe 25 then passes through the pre-processing filter 27 which, in turn, removes various harmful organic chemical materials contained in the water.

The water emerging from the pre-processing filter 27 is then introduced in the membrane filter 29 through the water supply valve 51 while being increased in pressure to a certain pressure by the pressure pump 57. While passing through the membranes of the membrane filter 29, the water becomes free of heavy metals, bacteria, cancer-causing materials and the like contained therein.

The water emerging from the membrane filter 29 then passes through the post-processing filter 31 by which odorous substances such as noxious gas are removed from the water. The water from the post-processing filter 31 is then supplied to the water tank 35 through the water inlet port 33.

At this time, the full water level sensor 37 senses the amount of water supplied to the water tank 35 through the water inlet port 33, namely, the water level of the water tank 35 and sends data indicative of the sensed water level to the control unit 104.

When the water level of the water tank 35 sensed by the full water level sensor 37 corresponds to the full water level, the control unit 104 applies a control signal to the valve driving unit 110 to shut off the supply of purified water to the water tank 35.

Since the water tank 35 is maintained in a state that it is seated on the purifier body 20, the protrusion 35a provided at the outer surface of the water tank 35 is in contact with the contact lever 55 of the microswitch 57. In this state, the microswitch 57 is in its ON state.

When the microswitch 57 is in its ON state, the control unit 104 determines that the water tank 35 is seated on the purifier body 20. In this case, the control unit 104 continuously carries out its control for executing the water purifying operation.

On the other hand, when the user separates the water tank 35 from the purifier body 20 for cleaning the interior of water tank 35 to remove foreign matter therefrom or for using a large amount of purified water at once, the protrusion 35a is separated from the contact lever 55 of microswitch 57, thereby causing the microswitch 57 to be switched to its OFF state.

When the microswitch 57 is in its OFF state, the control unit 104 determines that the water tank 35 is separated from the purifier body 20. In this case, the control unit 104 applies a control signal for stopping the purifying operation to both the pump driving unit 108 and valve driving unit 110.

On the basis of the control signal from the control unit 104, the pump driving unit 108 cuts off the source voltage being applied to the pressure pump 53, thereby stopping the driving of pressure pump 53. Similarly, the valve driving unit 110 cuts off the source voltage being applied to the water supply valve 51 under a control of the control unit 104, thereby closing the water supply valve 51.

When the pressure pump 53 is stopped while the water supply valve 51 is in its closed state, the supply of water from the faucet 22 to the water supply pipe 25 via the connecting member 23 is automatically shut off. Accordingly, the water purifier stops its water purifying operation.

As apparent from the above description, the present invention provides a water supply shut-off device for a water purifier, capable of automatically cutting off electric power, upon a water tank separating from the water purifier, to stop the water purifying operation, thereby providing convenience upon using the water purifier and improving the sanitariness and reliance of the water purifier.

Having described specific preferred embodiment of the invention with reference to the accompanying drawings, it is to be understood that various changes and modifications may be effected therein by one skilled in the art without departing from the scope or spirit of the invention as defined in the appended claims.

What is claimed is:

1. A water purifier for purifying and storing water supplied thereto, comprising:

a body;

a filtering section on the body for purifying water;

a pump for pressurizing water for travel through at least a portion of the filtering section;

a water storage tank removably mounted on the body, the storage tank including a rear side and a front side, the rear side including a water inlet for receiving purified water from the filtering section, the front side including a water discharge outlet disposed adjacent a bottom of the storage tank for dispensing purified water;

a conduit extending between the filtering section and the water storage tank for conducting purified water to the water storage tank, the water storage tank being accessible for removal from the body at a time when purified water is being conducted thereto;

a valve for opening and closing the conduit;

a first sensor comprising a water level detector for sensing a full water level in the water storage tank;

a second sensor operable independently of the first sensor for sensing a removal of the water storage tank from the purifier body; and a controller connected to the first and second sensors and to the pump and the valve for closing the valve in response to a water level in the water storage level reaching the full water level, and for deactivating the pump and closing the valve in response to the tank being sensed as removed from the body.

2. The water purifier according to claim 1, wherein the second sensor comprises a switch movable to a first position whenever the storage tank is removed from the body, and movable to a second position whenever the storage tank is mounted on the body regardless of the amount of water contained in the storage tank; the water level detector being disposed on the storage tank and connected to the controller; the controller being operable to activate the pump and open the valve in response to receiving a signal from the water level detector that the water level is below a reference level.

3. The water purifier according to claim 2 wherein the second sensor comprises a switch mounted on the purifier body and including a contact lever engageable with the water tank.

4. The water purifier according to claim 2 wherein the filtering section includes a preprocessing filter, a membrane filter, and a post-processing filter; the filters connected in sequence; the pump connected for pressurizing at least the water flowing through the membrane filter.

5. The water purifier according to claim 2, wherein the switch is mounted on the body at a location rearwardly of the storage tank.

6. The water purifier according to claim 1, wherein the controller is operable to deactivate the pump and close the valve by cutting off the supply of electric power to the pump and to the valve.

* * * * *